United States Patent [19]

Baratoff

[11] 4,040,590

[45] Aug. 9, 1977

[54] VIBRATION ISOLATOR WITH INTEGRAL NON-AMPLIFYING SEISMIC RESTRAINT

[75] Inventor: Paul Baratoff, Jackson Heights, N.Y.

[73] Assignee: Korfund Dynamics Corporation, Westbury, N.Y.

[21] Appl. No.: 640,582

[22] Filed: Dec. 15, 1975

[51] Int. Cl.² ........................................... F16F 15/04
[52] U.S. Cl. ................................ 248/358 AA; 52/167; 188/1 B; 267/134
[58] Field of Search ............................ 188/1 B, 271; 248/358 R, 358 AA, 350, 18, 20, 26; 267/9 R, 134, 174; 52/167

[56] References Cited

U.S. PATENT DOCUMENTS

| | | | |
|---|---|---|---|
| 1,763,682 | 6/1930 | Wallace | 248/18 |
| 2,173,342 | 9/1939 | Rosenzweig | 248/20 |
| 2,281,955 | 5/1942 | Rosenzweig | 248/20 |
| 2,359,915 | 10/1944 | Hussman | 248/20 X |
| 2,586,307 | 2/1952 | Crede | 248/358 X |
| 2,631,841 | 3/1953 | Tillou et al. | 248/20 |
| 2,660,386 | 11/1953 | Munro | 248/358 |
| 2,687,270 | 8/1954 | Robinson | 248/358 AA |

FOREIGN PATENT DOCUMENTS 454,773  3/1949  Canada .................................. 248/20

Primary Examiner—George E. A. Halvosa
Attorney, Agent, or Firm—Brumbaugh, Graves, Donohue & Raymond

[57] ABSTRACT

The force transmitted to vibration-isolated equipment during a seismic event can be essentially limited to the force generated by the floor input acceleration by a combination of friction restraining devices and energy-absorbing stops constructed into the vibration isolators which support the equipment. The friction restraint devices permit essentially undamped vibration of the equipment during normal operation but provide a frictional force which restrains vibration of the equipment at amplitudes greater than a selected value. Any movement of the equipment in excess of the selected amplitude that results from a floor input force that exceeds the frictional restraining force of the friction restraint devices is limited by the energy-absorbing stops, which transmit to the equipment with a small amplification only the residual of the input force over the frictional force.

16 Claims, 12 Drawing Figures

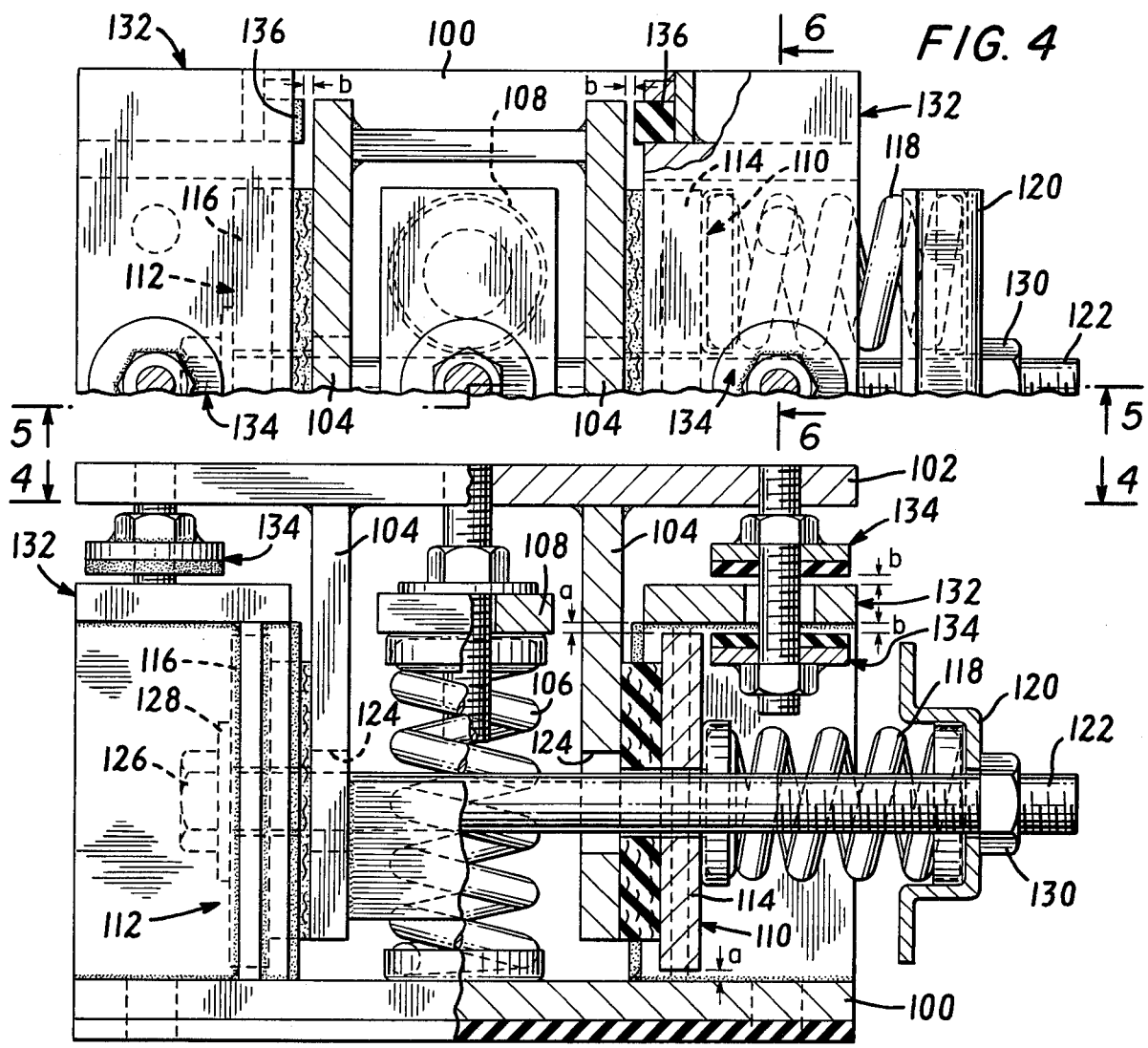
FIG. 4
FIG. 5
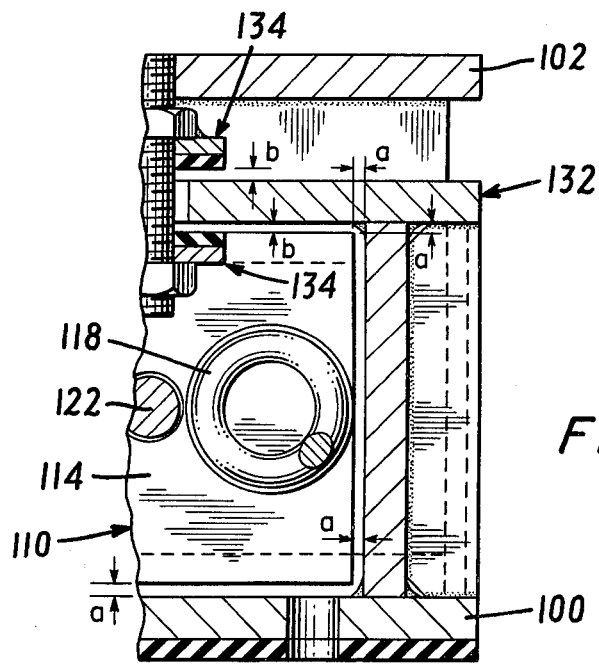
FIG. 6

VIBRATION ISOLATOR WITH INTEGRAL NON-AMPLIFYING SEISMIC RESTRAINT

BACKGROUND OF THE INVENTION

All rotating and reciprocating machines vibrate, in general, as a result of imbalances inherent in the machines, and although careful designing and balancing of the equipment can limit vibration, it is common practice to mount such equipment on vibration isolators to isolate the floor or other supports on which they are mounted from the equipment. It is also common to mount equipment that is sensitive to vibration on vibration isolators to isolate the equipment from vibrations of the floor or other structure. The technology of vibration isolators is highly developed, and the solutions to particular problems in specific installations is ordinarily a matter of engineering skill, coupled with judgements and compromises based on experience.

The frequency of vibration of the equipment varies with operating speed and must, of course, be considered as an important part of the design of the isolator. Normally, the natural frequency of the isolator is established well below the normal operating frequency of the vibratory equipment to ensure against resonant operation and excessive amplitude of vibration. However, in starting up or shutting down the equipment, there are unavoidable transient vibrations that are in resonance with the natural frequency of the isolators on which the equipment is mounted. Under transient conditions, if the weight of the isolated equipment is not very large as compared with its residual unbalance, the amplitude of vibration of the equipment may become excessive unless some restraint or limit is placed on it.

There are two well-known techniques for limiting vibration of vibration-mounted equipment under transient conditions. One technique is to provide damping, such as by inherent material damping or light friction damping or, if this is not sufficient, by means of special purpose viscous or friction-type dampers which smooth or flatten the response curve and lower the amplitude of resonant or near resonant vibration of the equipment under transient conditions. Normally, damping in vibration isolators is relatively light, inasmuch as damping increases both force transmission and amplitude transmission from the equipment to the support when the vibration frequency of the equipment is greater than 1.44 times the natural frequency of the equipment, which it normally is. The other technique for preventing excessive vibration under transient conditions is to use stops for physically stopping movement of the equipment in excess of a selected maximum. Special purpose friction or viscous type dampers are rarely used in vibration isolators; the use of such dampers has been confined for the most part to spring-mounted equipment that is vibrated intentionally for a specific purpose, for example, vibrating screens, vibrating conveyors, centrifuges and the like and also for impact machines such as forging hammers, large presses, etc. Light damping and stops have normally been adequate to protect against excessive transient vibration in rotary and reciprocating equipment that is inherently vibratory, but not intentionally so.

The present invention relates to quite a different problem from that of isolating a floor or other structure or equipment mounted on the floor or structure from the normally occurring but undesired vibration of rotating or reciprocating equipment or of intentionally vibrated equipment. Rather, the invention has as an object minimizing the acceleration transmitted to vibration-isolated equipment from unusual forced motion, of a vibratory nature, of the floor or support on which the equipment is mounted, particularly motion caused by a seismic disturbance (earthquake). The problem might best be considered by presenting a typical example.

FIG. 12 of the drawings is a typical curve showing the response spectrum in a given direction (vertical or horizontal) for a particular piece of isolated equipment installed on the upper floor of a building. The natural frequency of a building floor can be calculated or determined in accordance with known techniques, and in the example, it can be read from FIG. 12 to be about 10 cps. The abscissa of the graph in FIG. 12 represents a spectrum of natural vibration periods of the vibration-mounted equipment in question, and the ordinate of the curve represents the input acceleration to the equipment; thus, the curve depicts the magnitudes of accelerations of the vibration-isolated equipment over a spectrum of natural periods of the equipment. The values of acceleration given by the ordinate of the curve presuppose a given input acceleration of the floor, a value that may be determined on the basis of the probability of a seismic disturbance of a certain magnitude, and by considering particular building characteristics. In the example, the input acceleration, as obtained from FIG. 12 (extreme left end of the curve), is 0.25 g.

The curve depicted in FIG. 12 is somewhat analogous to the well-known transmissibility curves that are covered in numerous textbooks on vibration in that input acceleration from the floor to the equipment via the isolators on which the equipment is mounted and the natural frequency of the floor are implicity included in the ordinate and abscissa values on the curve, respectively, although the plots are in terms of acceleration of the equipment and natural period of the equipment. Accordingly, the curve represents the transmissibility of a given input acceleration to the vibration-mounted equipment as a function of a spectrum of natural frequencies of the vibration-isolated equipment under a constant forcing frequency (the frequency of the floor). The curve assumes light damping, and is thus flatter than it would be if damping were not assumed.

The response spectrum illustrated in FIG. 12 itself suggests two possible ways of minimizing the acceleration transmitted to the equipment. The first solution is to provide a natural period for the vibration-isolated equipment that is far to the right (in the curve) of the peak amplitude, preferably a very soft system which, in fact, may reduce acceleration transmitted to the equipment to below the input acceleration of the floor. The selection of very soft springs, however, has the disadvantages of high cost and of requiring a large sway space around the equipment. It would, of course, be possible to accept some amplification of the floor input acceleration, thereby reducing the cost of the isolators and reducing the amplitude of movement of the euqipment in response to an input acceleration from the floor, but the spring selection would still be an undesirable compromise between the most economical isolator based on the vibration isolation requirements and the objective of limiting the force and motion transmitted to the equipment in the event of seismic disturbances.

A second solution is to select a stiffer, more economic spring system that meets the requirements of the vibration isolator from the standpoint of isolating the floor from vibration of the equipment and providing stops to restrain movement of the equipment relative to the floor. It is not possible to read from the graph the acceleration transmitted to the equipment when stops are employed, but the acceleration can be determined, and will be greater than the input acceleration from the floor. In general, the stops in such a system would merely limit the amplitude of movement of the equipment, but would not prevent amplification of the floor input acceleration.

SUMMARY OF THE INVENTION

The present invention relates to a way of reducing amplification of an input acceleration from a floor or other support through vibration isolators to vibration-isolated equipment while permitting optimization of the design of the vibration isolators from the point of view of isolating the floor or other support from vibrations of the equipment. The invention makes it possible to limit the acceleration of the vibration-mounted equipment to essentially the floor input acceleration with only a negligible amplification, if any, through the vibration isolator. Moreover, the system acts in reverse; it prevents amplification by the isolator of input forces from the equipment and, therefore, takes care of transient conditions of operation of the equipment as in the case of intentionally vibrated equipment (vibrating screens, conveyors and the like).

In accordance with the invention, a vibration isolator provides restraint against seismic disturbance by way of a combination of friction restraint devices and energy-absorbing stops. The friction restraint devices are arranged to be ineffective during normal operation of the equipment in that they permit essentially undamped, natural vibration of the equipment in normal operation. Nonetheless, the friction restraint devices become effective when the vibration of the equipment relative to the floor (or vibration of the floor relative to the equipment) slightly exceeds the normal amplitude of vibration under normal operating conditions.

A vibration isolator, according to the present invention, comprises a first member, a second member and at least one spring supporting the second member in spaced relation to the first member for vibration isolation of vibratory equipment carried by the second member. A friction restraint system composed of brake plates and brake shoes associated with the respective members of the vibration isolator are constructed and installed in a manner such that they restrain relative movement of the members in excess of a selected amplitude $a$ that is slightly greater than the amplitude of vibration of the equipment in normal operation by frictionally developed forces that are established at a value close to the floor input forces likely to be caused by a seismic disturbance while they permit essentially undamped vibration of the equipment at any amplitude less than the value $a$. The vibration isolator also includes energyabsorbing stops interposed between the members for controlling vibration of the first member in excess of a selected amplitude $b$ that is slightly higher than the value $a$ and for absorbing energy generated by an input force acting on one of the members, that is in excess of the frictional force developed by the friction restraint system.

In normal operation of a vibration isolator embodying the present invention, the springs interposed between the two members of the isolator limit transmission of force from the vibratory equipment mounted on the isolator and permit normal vibration of the equipment.

In the presence of abnormal conditions, such as an input force generated by an earthquake, imposed by the floor or other support on which the vibration isolator is mounted to the isolator, the friction restraint system becomes effective to generate a restraining force, acting between the members of the isolator, for preventing a force transmission directly through the springs of the isolator, and thus an inevitable magnification of an input force by the springs as an output force from the springs to the other member of the vibration isolator.

For example, in the case of a seismic disturbance which generates an input force from the floor to the floormounted member of the isolator, the friction restraint system provides, to the extent that the input force is less than the friction force, a rigid connection between the two members of the isolator and therefore provides transmission of an output force to the vibration-isolated equipment equal to the input force from the floor.

In cases when an input force to the floor exceeds the frictional forces developed by the friction restraint system, the brake shoes will slip and permit relative movement between the equipment and the floor and, of course, relative movement between the members of the isolator. Upon such movement, the energy-absorbing stops become engaged and limit the extent of movement. The force transmitted through the stops is merely the residual force, which will generally be small, by which the input force to the isolator exceeds the frictional forces generated by the friction restraint system. Accordingly, even though the stops will amplify somewhat the residual of the input force that is imposed on them, the total amplification of the input force is a very small fraction, and as a practical matter negligible, inasmuch as it is an amplification only of such residual force rather than of the entire input force.

The invention provides the advantages of permitting the optimum design as far as vibration isolation in normal operation of the equipment is concerned, coupled with an effective, essentially rigid restraint system that comes into play in the event of an earthquake. The isolator very effectively avoids the disadvantages of heavy damping, of soft springs and of stops used alone in that it limits under all conditions the amplitude of movement of equipment on the isolators and limits to a negligible amount amplification by the isolator of input forces to the isolator.

For a further description of the invention, and a better understanding thereof, reference may be made to the following description of exemplary embodiments, taken in conjunction with the figures of the accompanying drawings, in which:

FIGS. 4, 5 and 6 are partial plan, full side elevational and partial end cross-sectional views of an isolator which has two-directional seismic restraint, again with portions of the views broken away in section;

Figure 11:
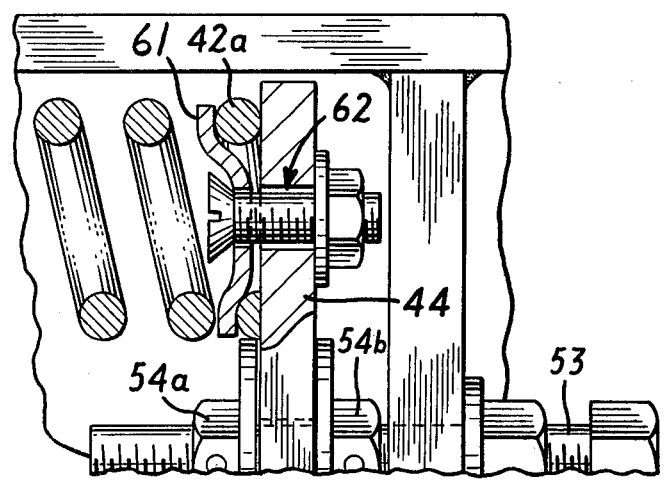
Figure 12:
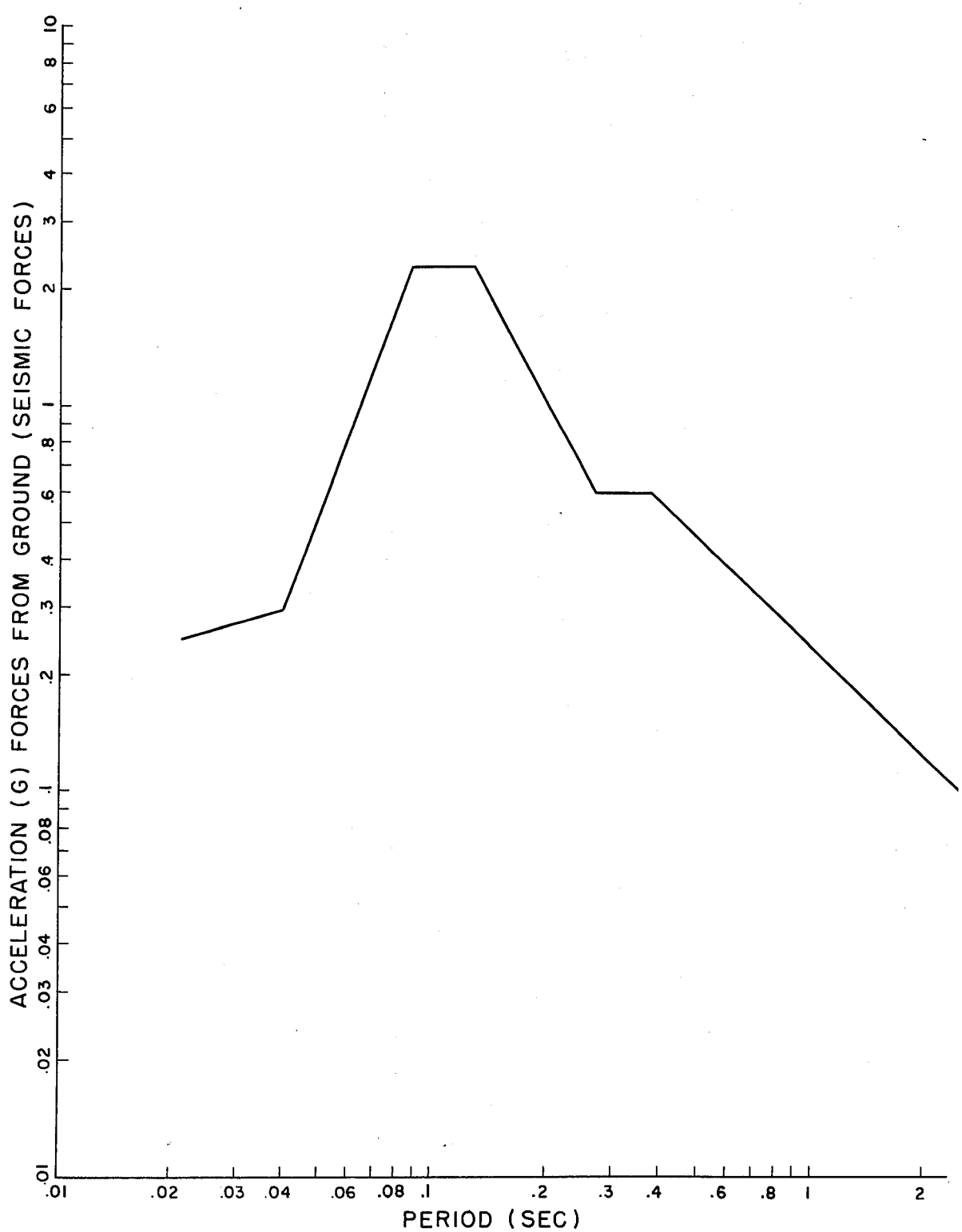

FIG. 11 is a detail view of connections of a spring to a plate and of an adjusting bolt to a plate that may be used to advantage in the invention; and FIG. 12 is a typical curve showing a response of vibration isolated equipment in a given direction to a given input acceleration over a spectrum of natural frequencies of the vibration isolated equipment under the influence of a given constant forcing frequency.

DESCRIPTION OF THE EXEMPLARY EMBODIMENTS

All of the embodiments illustrated in the drawings and described hereinafter are vibration isolators of the type that are used to mount rotating or reciprocating equipment on a floor or other structure. Such vibration isolators are commonly used in mounting generating equipment, motors, blowers and many other types of machinery in factories and commercial buildings. The invention, however, is applicable not only to floor-mounted isolators for mounting equipment on floors but can be applied to isolators for suspending equipment from beams, ceilings, columns and walls.

Figure 1:
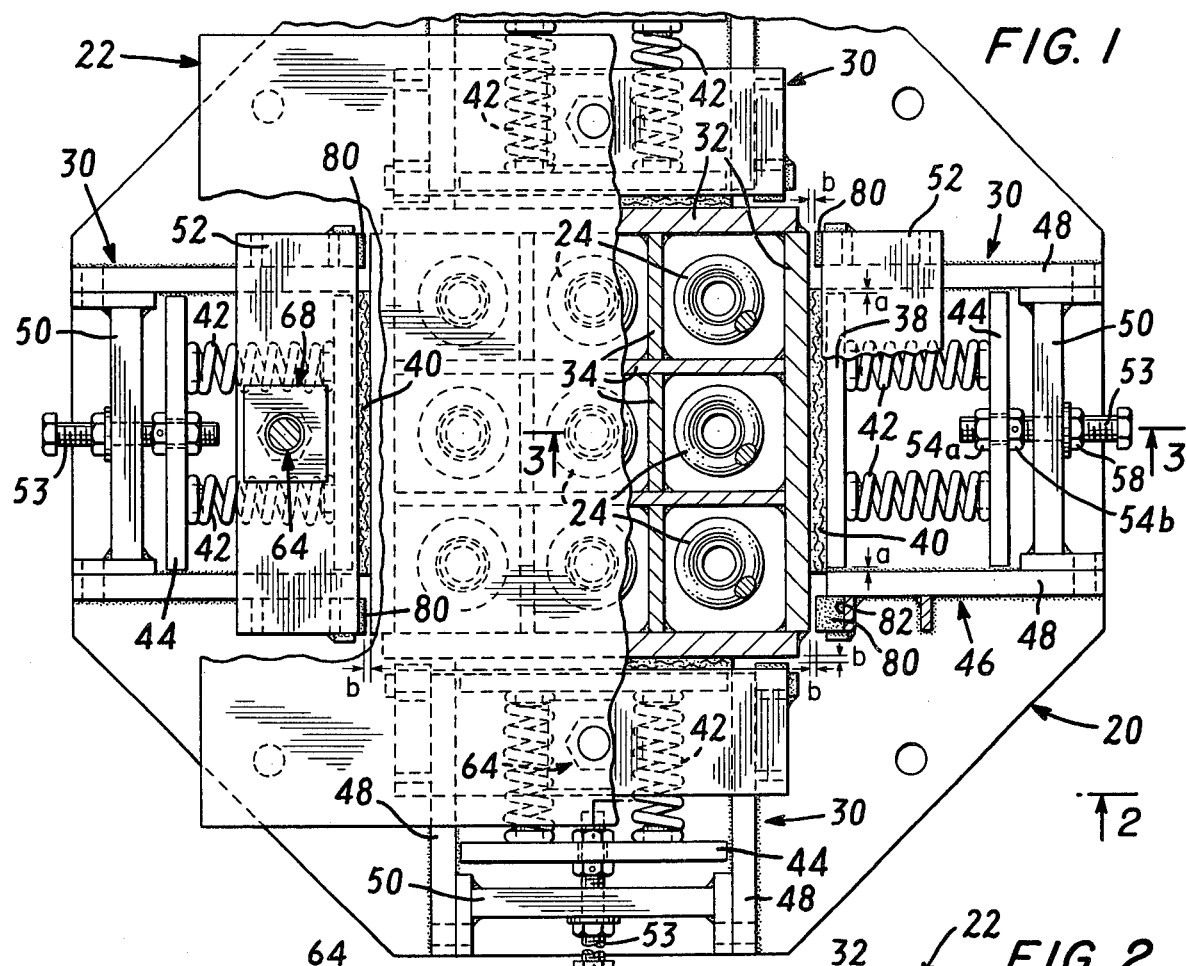
FIGS. 1, 2 and 3 are plan, side elevational and partial side cross-sectional views, respectively, of one embodiment of isolator, having omni-directional seismic restraint, portions of FIGS. 1 and 2 being broken away in section for clear illustration.
Figure 2:
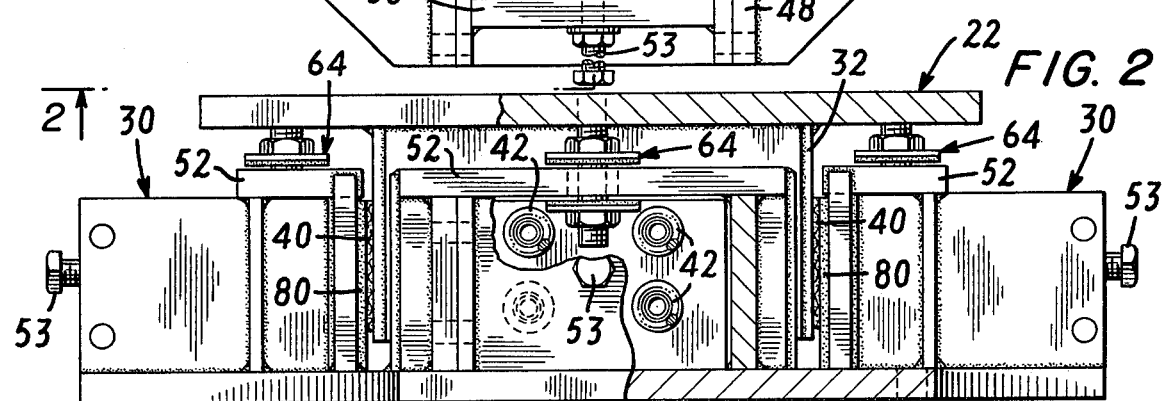
Figure 3:
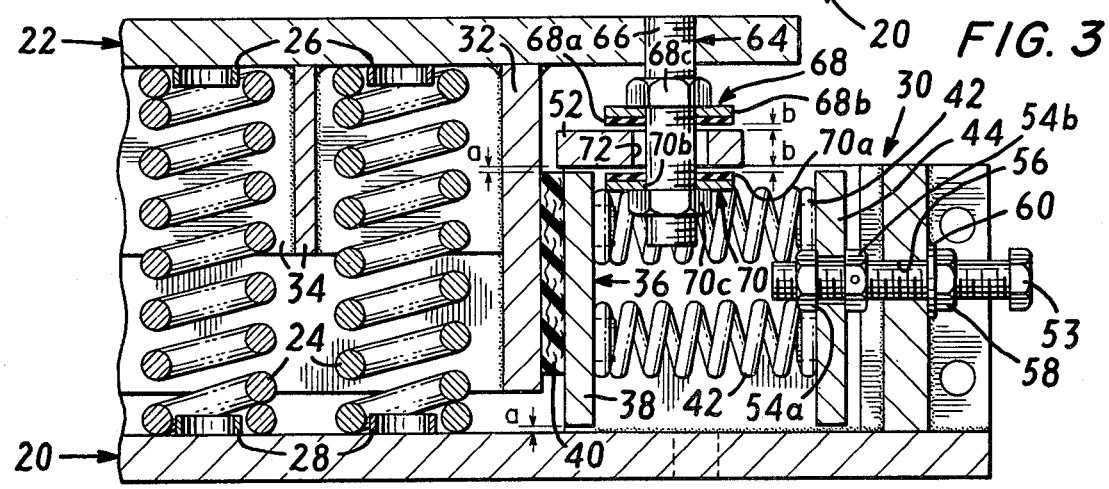

Referring to FIGS. 1 to 3 the reference numerals 20 and 22 designate generally base and mounting members, respectively, of the isolator, both of which are flat steel plates of substantial thickness to impart rigidity and load distribution characteristics. The mounting plate 22 is supported above the base plate 20 by nine coil springs 24, the characteristics of which are established, in accordance with well-known engineering principles, to provide isolation of vibrations of equipment mounted on the mounting plate 22 from the base plate 20 and, thus, from the floor. The number of springs may, of course, vary depending on the requirements of the isolator. The springs 24 are kept in proper position between the plates 20 and 22 by annular positioning rings or guides 26 and 28 welded to the mounting plate 22 and base plate 20 within each spring 24.

The embodiment illustrated in FIGS. 1 to 3 of the drawing includes four identical friction restraint assemblies 30, the assemblies being located on mutually perpendicular, horizontal medial axes of the vibration isolator, such axes hereinafter being referred to as X axis and Y axis. Each of the friction restraint assemblies comprises a flat, vertical brake plate 32 which is welded to the underside of the mounting plate 22. The four brake plates 32 associated with the four restraint assemblies 30 form a box-like structure on the underside of the mounting plate, the respective ends of the plates 32 being welded together and mutually perpendicular stiffener plates 34 being welded into a reinforcing network on the underside of the mounting plate within that box-like structure.

Each friction restraint assembly 30 also includes a brake shoe 36 which is composed of a flat, steel backing plate 38 and a plate 40 of high friction material suitably connected to the backing plate 38 such as by rivets or bolts (not shown). Each brake shoe 36 is spring-loaded into engagement with a corresponding brake plate 32 by four springs 42, the force of the springs 42 being established by an adjustable spring backup plate 44. The brake shoe springs 42 and the plate 44 are received within a box-like housing 46 that is composed of vertical side plates 48 welded to the base plate 20, an end plate 50 oriented vertically, extending between and bolted to the side walls 48 and a top plate 52 that extends part way across the top in the axial direction of the assembly and entirely across the top in the lateral or transverse direction. Stiffening ribs and plates are included in the box assembly but need not be described in detail, inasmuch as they are matters of structural design and are within the skill of the art. The spring back-up plate 44 is made adjustable by clamping it onto a bolt 53 by means of a pair of nuts 54a and 54b, the bolt 53 being threaded through a hole 56 in the end plate 50 of the structure 46 and locked in an adjusted position by a locking nut 58 and lock washer 60. Thus, the force exerted by the springs may be adjusted to a desired value by loosening the inside nut 54a (see FIG. 1) and the locking nut 58, turning the bolt to thread it in a suitable direction through the threaded hole 56 and thereby move the plate in a desired direction and then retightening the nuts 54a and 58. The outside nut 54b is pinned to the bolt 53 to keep it from unthreading as the bolt 53 is rotated to adjust the position of the plate 44 and thereby set the desired forces into the springs.

Referring to FIG. 11 of the drawings, an alternative arrangement of the connection between the adjusting bolt 53 and the plate 44 involves pinning both of the nuts 54a and 54b to the bolt 53, leaving a small clearance between the plate 44 and the washers located between the respective bolts and the plate. With the arrangement shown in FIG. 11, the bolt 53 and the nuts 54a and 54b are free to rotate in the hole in the plate, and it is not necessary to loosen the nut 54a.

Referring briefly to FIG. 11 of the drawings, both ends of each spring 42 are clamped rigidly to the backing plate 38 and to the back-up plate 44 by a specially shaped clamp 61 which is received within the first coil 42a at the end of the spring and is tightened down on the coil 42a by a bolt 62 to clamp it to back-up plate 44, as shown in FIG. 11. A similar arrangement to that shown in FIG. 11 is provided to clamp the other ends of the springs 42 to the backing plate 38 of the brake shoe 36. The springs 42 are clamped to the back-up plates 44 and the brake shoes 36 to support each brake shoe in a predetermined position in the corresponding supporting structure 46, as described in more detail below.

The embodiment of the vibration isolator illustrated in FIGS. 1 to 3 also includes in association with each of the friction restraint assemblies a vertical energy-absorbing stop assembly 64, there thus being four stop assemblies, two centered on each of the axes X and Y, all four being identical. As may best be seen in FIG. 3, each stop assembly 64 comprises a stud 66 that extends vertically down from the mounting plate 22 and receives a pair of vertically spaced apart stop plates 68 and 70 each of which is composed of an energy-absorbing pad 68a, 70a, a steel back-up plate 68b, 70b, and a nut 68c, 70c, those three components being securely joined to each other to form a composite unit. Each stop plate 68 and 70 is adjusted to be in predetermined clearance, as indicated by the letters b in FIG. 3, with the top and bottom surfaces of the top plate 52 of the housing 46, the stud 66 extending through an oversized hole 72 in the top plate 52. The energy absorbing stops 68 and 70 limit the movement of the mounting plate 22 relative to the base plate 20 in the vertical direction.

The amount of horizontal movement of the mounting plate 22 relative to the base plate 20 in either direction along either of the X and Y axes of the vibration isolator is limited by four pairs of energy absorbing stops 80, one pair of which is mounted on each edge of the housing 46 of each of the four friction restraint assemblies; in other words, there is associated with each friction restraint assembly 30 of the vibration isolator a pair of energy absorbing stops 80. Each stop 80 is a block of moderately compressible resilient material that is mounted vertically in a small box 82 constructed along the outside wall of each side plate 48 of the housing 46, the external surfaces of the blocks 80 being spaced from the brake plate 32 by a distance $b$ which can be a distance or dimension equal to the dimension $b$ at the stops 68 and 70 of the vertical stop assembly, but is not necessarily so.

The isolator shown in FIGS. 1 to 3, and indeed any isolator constructed in accordance with the present invention, will be designed in accordance with known principles to provide isolation of vibrations of equipment mounted on the mounting plate 22 from the base plate 20. In the normal operation of the vibratory equipment mounted on the isolator, the equipment and the mounting plate 22 will vibrate with an amplitude and frequency that can readily be determined based on the forcing frequency of the equipment and the natural frequency of the isolator. Such vibration will be in the vertical or Z axis direction and in both the horizontal or X and Y directions. The vibration isolator of FIGS. 1 to 3 is constructed to permit normal vibration of the equipment without bringing the friction restraint or energy-absorbing stop systems into operation. In particular, the brake shoe 36 is mounted with predetermined clearances, which are indicated by the dimension lines designated by the letter $a$ in the drawings, in the vertical and both horizontal directions with the base plate 20, the side walls 48 and the top plate 52 of the housing. The value of the dimension $a$ is selected to be a value that is slightly greater than one-half of the total movement in vibration of the equipment and the mounting member 22 relative to the base plate 20 in the normal, steady-state operation of the vibratory equipment mounted on the isolator. Accordingly, the mounting member 22, the brake plate 32 and the brake shoe 36 vibrate together relative to the base plate 20 and the housings 46 of the friction restraint assemblies without causing any contact of the brake shoe 36 with the top, bottom and sides of the housings 46. The clearances $b$ between the stops and the members that engage them are selected to be slightly greater than the clearances $a$. Inasmuch as the clearances $a$ are present in all four of the restraint assemblies in the vertical or Z axis and both horizontal or X and Y axes directions, vibration of the equipment and the mounting plate 22 relative to the base plate 20 of a total movement less than two times the dimension $a$ is afforded in the X, Y and Z axes directions without the brake or stop assemblies becoming operative.

In the event of a disturbance of the normal, steady-state operation of the isolator resulting in total relative movement of the mounting plate and the base plate in the X, Y or Z directions equal to two times $a$ such as movement due to force vibration of seismic origin of the building floor on which the vibration-isolated equipment is carried, the backing plates 38 of the brake shoe 36 will engage the housings 46 as follows: the base plate 20 and the top plate 52 of the housing 46 in the case of an increase in the amplitude of vibration along the Z axis (i.e., vertically); the side plates 48 of the housings 46 in the case of an increase in horizontal vibration of the member 22 relative to the base plate 20 along either the X or the Y axis (i.e., horizontally).

Prior to engagement of the brake shoes with parts of the housings 46 or the base plate 20 of the vibration isolator, the friction restraint assemblies 30 transmit essentially negligible forces between the base plate 20 and the mounting plate 22, such forces being predominantly those transmitted upon lateral deflection of the springs 42 of the restraint assemblies. Whenever a brake shoe engages parts of the housing 46 or the base plate 20 of the isolator, the brake shoes 40 become capable of transmitting forces equal to the frictional force developed between the brake shoes and the brake plates 32, forces which are established by the degree of compression set in the springs 42. If the force due to acceleration upon relative vibration between the members 22 and 20 is less than the total frictional force developed between the brake shoes 36 and the brake plates 32, relative movement between the base plate 20 and the mounting plate 22 of the isolator is prevented at the point when engagement occurs between the brake shoes 36 and parts of the housing 46 or the base plate 20.

Assuming, for example, that an earthquake sets up vibration in a building of a magnitude generating forces acting on the base plate 20 that are less than the frictional forces between the brake shoes and the brake plates of the isolator, such forces are transmitted through the friction brakes into the brake plates 32 and lock the isolator so that it becomes functionally a rigid mounting. Accordingly, there is practically no amplification of the force or the amplitude of vibration of the floor via the mounting springs 24, as would normally be the case with a conventional vibration isolator.

If the forces transmitted from the floor through the base plate 20 into the brake shoes exceeds the frictional forces developed between the brake shoes and the brake plate 32, the base plate 20 will move relative to the mounting plate 22, inasmuch as the brakes will slip. In the event of slippage of the brakes, the energy-absorbing stops become engaged, impede movement of the mouting plate 22 relative to the base plate 20, and absorb the residual of input energy not absorbed in the brakes.

As mentioned above, the clearances $b$ between the energy-absorbing stops 68 or 70 and the top plates 52 of the housing 46 and the clearances $b$ between the energy absorbing stops 80 and the brake plates 32 are slightly greater than the clearances $a$ between the brake shoes and the parts which surround them. Accordingly the stops become operative only upon slippage of the brakes which, in turn, occurs only when the forces imposed on the base plate 20 are greater than the frictional forces developed in the brakes in the direction in question. It is important to note that the brakes transmit a major part of a force imposed by the floor on the base plate 20 that results from an abnormal disturbance i.e., from the earthquake. In cases when such forces exceed the frictional forces developed in the brakes, the stops are subject to only a residual of force, the difference between the total external force applied and the part of that total force transmitted through the brakes. Inasmuch as there is, preferably, only a small difference between the clearances $b$ and clearances $a$, the momentum of a member moving relative to the other that results in engagement of the stops is also small; the amplification of the residual force imposed on the stops by the resilient members of the stops is also small.

Thus, the friction restraint system and the stop system embodied in the invention involve, in those cases in which the applied disturbing forces exceed the brake forces, splitting a total external applied force between the brakes and the stops, and the transmittal of forces directly through the brakes and stops between the base plate 20 and the mounting plate 22 is substantially equivalent, functionally, to the transmittal that would be afforded by a rigid mounting. Apart from a small amplification of force in the resilient stops, which amplification involves only a relatively small force in the first place that is, the residual of the input force over and above the frictional force developed in the brake, an external force of seismic origin imposed by the floor on the isolator is transmitted without significant amplification to the equipment.

The other embodiments of the invention illustrated in the drawings, are in principle and in mode of operation the same as the embodiment of FIGS. 1 to 3, but include a number of variations in the precise construction of the isolator.

The embodiment illustrated in FIGS. 4 to 6 includes a base plate 100 and a mounting plate 102 having a pair of laterally spaced-apart brake plates 104 extending vertically down from the underside and located on either side of a pair of mounting springs 106. An adjustable spring compression plate 108 permits the operating height of the isolator to be adjusted. It might be mentioned at this point that the operating height of the embodiment of FIGS. 1 to 3 is obtained by shimming between the equipment and the mounting plate 22 of the isolator.

Friction restraint assemblies 110 and 112, each of which includes a brake shoe 114 and 116, respectively, are positioned outwardly of and in engagement with the brake plates 104. A desired frictional force is developed between the brake shoes 114 and 116 and the brake plates 104 by a set of springs 118, the force in which is adjusted by the setting of a movable cap 120. A tie rod 122 extends transversely through oversized holes 124 in the brake plates 104 and through the respective brake shoes 114 and 116 and clamps the two brake shoes to the brake plates 104 via the springs 118. In the embodiment illustrated, the tie rod 122 is a bolt, the head 126 of the bolt engaging a washer 128 that bears against the back surface of the brake shoe 116 and a nut 130 threaded onto the threaded end of the bolt engaging the compression cap 120. It should be apparent that the entire spring force is applied to each of the two brake shoes 114 and 116. As in the embodiment of FIGS. 1 to 3, the embodiment of FIGS. 4 to 6 involves establishing clearances $a$ slightly in excess of one-half of the total movement in vibration of the mounting plate 102 relative to the base plate 100 in steady-state, normal operation of the vibration mounted equipment between the brake shoes 114 and 116 and adjacent portions of box-like brake shoe housings 132 that are welded to the base plate 100, such clearances $a$ being provided entirely about the perimeter of the respective brake shoes.

The clearances $a$ are established during assembly of the isolator by using temporary spacers similar or identical to those described below in connection with the embodiments of FIGS. 7 to 9 and shown in FIGS. 7 to 9.

The embodiment of FIGS. 4 to 6 also includes energy absorbing stops 134 that operate in the vertical or Z direction and stops 136 acting in the X direction, that is horizontally, the respective stops 134 and 136 being in clearance with the members that engage them by a clearance dimension $b$ that is slightly greater than the clearance dimension $a$ in the friction restraint assemblies.

As in the case of the embodiments of FIGS. 1 to 3, the vibration isolator shown in FIGS. 4 to 6 of the drawings is constructed to provide for normal vibration of the vibration mounted equipment without engagement of the friction brake assemblies or the stops under steady state conditions of operation of the vibration-isolated equipment. In the event of a force due to a disturbance of seismic origin of the floor, tending to increase the total movement in vibration of the mounting plate 102 relative to the base plate 100 in excess of twice the clearance dimension $a$, the friction brakes become engaged and transmit such force up to the frictional force present in the brakes due to the action of the springs 118 from the base plate 100 to the mounting plate 102, thus locking the isolator and preventing amplification of such force through the isolator between the floor and the equipment. Any residual force over the friction force of the brakes produces slippage in the brakes, and the stops become engaged to limit movement and absorb the energy of such residual force.

Figure 7:
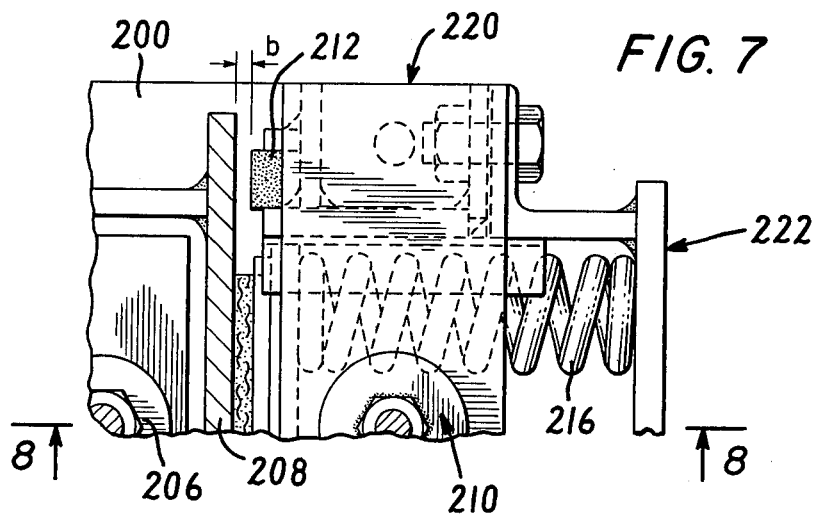
FIGS. 7, 8 and 9 are partial plan, side cross-sectional and end elevational views, respectively, of another embodiment of isolator having two directional seismic restraint, similarly broken away in section in portions thereof.
Figure 8:
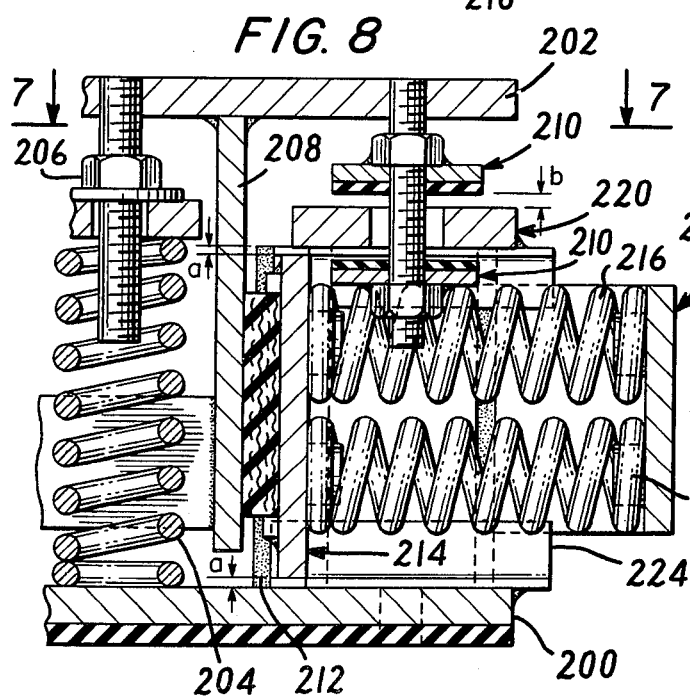
Figure 9:
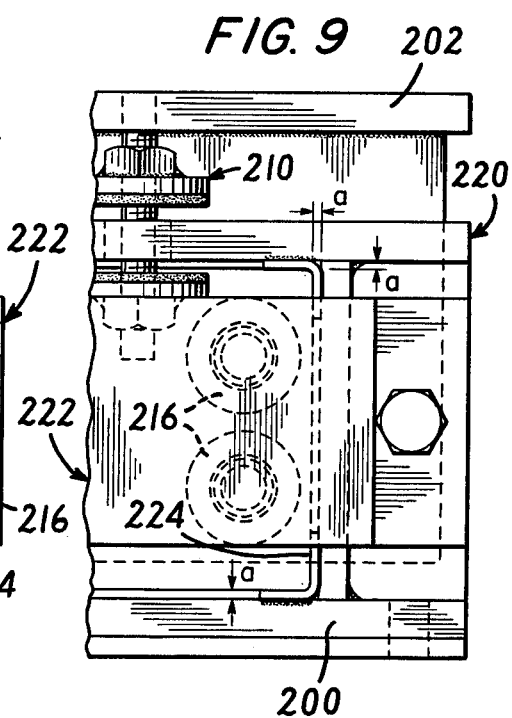

The isolator illustrated in FIGS. 7 to 9 of the drawings comprises a base plate 200, a mounting plate 202, a pair of springs 204, an adjusting assembly for adjusting the operating height of the isolator, and a pair of vertical brake plates 208 (only one of which is shown in the drawings) extending down from the underside of the mounting plate 202 on either side of the springs 204. Stops 210 acting in a vertical direction and stops 212 acting in the horizontal (X axis) direction are of a construction essentially the same as the stops of the two embodiments previously described. Brake shoes 214 located on opposite sides outboard of the brake plates 208 are urged by sets of springs 216 into engagement with the brake plates 208. Each of the brake plates is surrounded by a rigid housing 220 welded to the base plate 200. The forces in the springs 216 are established and maintained by a backing plate 222 that is bolted to the end of the housing 220, shims being used to set in the desired forces in the springs.

During assembly and adjustment of the isolator, the brake shoes 214 are kept in proper clearance, that is in a clearance having the dimension $a$, from the base plate 200 and the walls of the housing 220 by temporary spacers 224, one of which is located at each corner of each brake shoe (see particularly FIG. 9). Preferably, the spacers 224 are tack welded in place during assembly of the isolator to ensure that they will not come off and become lost in shipment or during installation of the equipment on the isolators. After field erection of the equipment on all isolators in the installation, all of the temporary spacers 224 are removed, and the isolator is ready for operation with proper clearances established. The use of temporary spacers 224 makes it unnecessary to clamp the springs to the backing plate and brake plate, as described above in connection with FIGS. 1 to 3 and 11 of the drawings, and as shown in FIGS. 7 to 9, tubular spring guides can be used in association with the springs 216.

Figure 10:
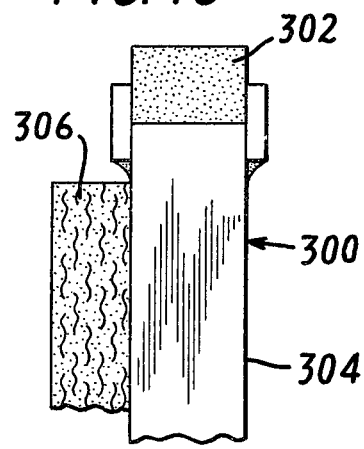
FIG. 10 is a detail view of the edge portion of a brake shoe that may be used in isolators embodying the present invention.

FIG. 10 of the drawings shows a modification of a brake shoe involving the provision of blocks 302 of energy-absorbing, resilient material along all edges of a backing plate 304 on which a friction brake shoe 306 is mounted. The arrangement shown in FIG. 10 prevents metal-to-metal contact between the backing plate 304 and the parts of the isolator which surround it when the brake plates come into contact with the surrounding parts.

The embodiments of FIGS. 4 to 6 and of FIGS. 7 to 9 provide two directional seismic restraints, that is seismic restraint in the vertical or Z-axis direction and seismic restraint in one horizontal or X-axis direction. Omni-directional restraint of the isolated equipment is obtained by using an even number of isolators on each side of a plane of symmetry of the equipment and orienting one half of the isolators on each side in one direction and the other half in a direction perpendicular to the direction of orientation of the first half.

I claim:

1. In a vibration isolator having a first member, a second member and at least one spring supporting the second member in spaced relation to the first member for vibration isolation of vibratory equipment carried by the second member, the improvement comprising friction restraint means coacting between the members for restraining vibration of the first member relative to the second member in excess of a selected amplitude $a$, the amplitude $b$ being greater than the amplitude of vibration in normal operation of the equipment, by a selected and adjusted frictionally developed force F while permitting essentially undamped vibration of any amplitude less than the amplitude $a$, said friction restraint means including at least one friction brake shoe, means interposed between the first and second members for mounting the brake shoe in a rest position between said interposed means and one of the members for essentially free movement from the rest position toward and away from said one of the members up to an amount equal to the amplitude $a$ and for preventing movement of the brake shoe from the rest position relative to said one of the members in excess of said amplitude $a$, at least one brake plate affixed to the other member positioned for engagement by the brake shoe, and spring means urging the brake shoe into engagement with the brake plate with a force sufficient to develop the frictional force F upon relative movement of the members in excess of the amplitude $a$, whereby a substantial part equal to the force F of an input force imposed upon one of the members tending to cause such relative movement is transmitted without amplification to the other member by the friction restraint means, and energy-absorbing stop means interposed between the members for restraining vibration of the first member relative to the second member in excess of a selected amplitude $b$, the amplitude $b$ being greater than the amplitude $a$, by absorbing energy generated by an input acceleration of one member relative to the other in response to an input force imposed thereon that is in excess of the frictional force F.

2. The improvement according to claim 1 wherein the stop means includes coengageable stop elements positioned for engagement with each other upon relative movements of the member in excess of the amplitude $b$, at least one such stop element being mounted on the first member and at least one such element being mounted on the second member, and at least one of such elements being resiliently compressible for energy absorption.

3. In a vibration isolator including a first member adapted to be supported on a structure, a second member adapted to support vibratory equipment, and a spring system connecting the members in spaced relation for vibration isolation of the equipment from the structure, the vibration isolator having a major medial vertical axis Z and mutually perpendicular medial horizontal axes Y and X, the improvement comprising a pair of brake plates carried by one of the members, each brake plate including a planar surface defining a plane parallel to the plane defined by the X and Z axes of the isolator, a pair of brake shoes, each of which is planar and is in engagement with the planar surface of one of the brake plates, means interposed between the first and second members for mounting each brake shoe in a rest position between said interposed means and the other member for movement from its rest position toward and away from the other member and for essentially free horizontal movement from its rest position relative to the other member of the isolator in two opposite directions parallel to the X axis up to a selected amplitude $a_x$ parallel to the X axis and for preventing movement of each brake shoe from its rest position relative to the other member in a direction parallel to the X axis in excess of the amplitude $a_x$, spring means urging each brake shoe into frictional engagement with the associated brake plate to develop a component of a selected and adjusted frictional force $F_x$ acting in a direction parallel to the X axis, whereby a substantial part equal to the force $F_x$ of an input force on one of the members acting in said direction is transmitted without amplification to the other member by the friction restraint means, and energy absorbing stop means coacting between the members for restraining relative motion between them in excess of a selected amplitude $b_x$ in a direction parallel to the X axis, which amplitude $b_x$ is not less than and not substantially greater than the amplitude $a_x$, and for absorbing energy generated by an input acceleration of one member relative to the other that generates a force component parallel to the axis X on said one member of a magnitude in excess of the frictional force component $F_x$.

4. The improvement according to claim 3 wherein the stop means includes coengageable stop elements positioned for engagement with each other upon relative movements of the members in the X axis direction in excess of the value $b_x$, at least one such stop element being mounted on the first member and at least one such element being mounted on the second member, and at least one of such elements being resiliently compressible.

5. The improvement according to claim 3 wherein the planar surfaces of the brake plates are located equidistance from the plane defined by the X and Z axes of the isolator.

6. The improvement according to claim 3 wherein the brakes plates are affixed to one of the members and the other member includes a housing around each brake shoe, the clearance between each housing and the associated brake shoe being equal to the value of the amplitude $a_x$.

7. The improvement according to claim 3 wherein said interposed means affords vertical movement of each brake shoe from its rest position toward and away from the other member in a direction parallel to the Z axis up to a distance equal to a selected amplitude $a_z$ of movement of the first member relative to the second member parallel to the Z axis and prevents vertical movement of each brake shoe from its rest position relative to the other member in excess of that distance.

8. The improvement according to claim 7 wherein the brake plates are mounted on the second member and the first member includes a housing surrounding each brake shoe, the clearance between each housing and the associated brake shoe in a direction parallel to the Z axis being equal to the amplitude $a_z$ such that movement of the brake shoe in a direction parallel to the Z axis is limited to the amplitude $a_z$ by engagement of the brake shoe with the housing.

9. The improvement according to claim 7 and further comprising second energy-absorbing stop means coacting between the members for restraining relative motion between them in excess of a selected amplitude $b_z$ in a direction parallel to the Z axis, the amplitude $b_z$ being not less than and not substantially greater than the amplitude of vibration of the second member along the Z axis in normal operation of the equipment.

10. The improvement according to claim 9 wherein the brake plates are affixed to the second member, the planar surfaces of the brake plates being spaced equidistantly from the Z axis, as measured along the Y axis, and being located outwardly with respect to the Z axis of the spring system of the isolator, and wherein the planar surfaces of the brake plates face outwardly, the brake shoes being located outwardly of the brake plates, and further comprising a pair of housings affixed to the first member, one such housing surrounding each of the brake shoes and in a clearance relation with the corresponding brake shoe such as to afford movement of each brake shoe relative to the second member up to selected amplitudes $a_x$ and $a_z$ and prevent movement of the brake shoe relative to the second member in excess of the amplitudes $a_x$ and $a_z$ respectively.

11. The improvement according to claim 10 wherein each spring means includes a compression spring engaged between the corresponding brake shoe and a mounting plate affixed to said other member.

12. The improvement according to claim 10 wherein the spring means includes a tie adjusting rod extending parallel to the Y axis of the isolator and through openings in the brake plates and brake shoes, a spring retainer at at least one end of the tie rod and at least one compression spring engaged between at least one spring retainer and the adjacent brake shoe, said one retainer being positioned on the tie rod to develop predetermined forces in the compression spring, and the openings through the brake plates being in clearance relation with the tie rod to permit movement of the tie rod in excess of the amplitudes $b_x$ and $b_z$.

13. The improvement according to claim 10 wherein each housing on the second member includes a horizontal part having upper and lower surfaces and a hole therethrough, and wherein the stop means includes a pair of stop assemblies, each of which includes a rod affixed to the first member and extending through the hole in the horizontal part of a respective housing and a pair of vertically spaced-apart stop elements located on opposite sides of the horizontal part in a clearance from the respective upper and lower surfaces of the horizontal part equal to the amplitude $b_z$.

14. The improvement according to claim 3 and further comprising a second pair of brake plates carried by said one of the members, each second brake plate including a planar surface defining a plane parallel to the plane defined by Y and Z axes of the isolator, a second pair of brake shoes, each of which is in engagement with the planar surface of one of the second brake plates, means interposed between the first and second members and mounting each of said second pair of brake shoes in a rest position between said interposed means mounting said second pair of brake shoes and the other member for essentially free horizontal movement from its rest position relative to the other member of the isolator in two opposite directions parallel to the Y axis up to a selected amplitude $a_y$ and for preventing movement of each of said second brake shoes relative to the other member in a direction parallel to the Y axis in excess of the amplitude $a_y$, each of said second pair of brake shoes being mounted also for vertical movement from its rest position toward and away from the other member of the isolator up to a selected amplitude $a_z$ and being restrained from vertical movement from its rest position relative to the other member in excess of the amplitude $a_z$, and second spring means urging each such second brake shoe into frictional engagement with the associated second brake plate to develop components of selected and adjusted frictional force $F_y$ and $F_z$ acting in directions parallel to the Y and Z axes, respectively, whereby substantial parts equal to the forces $F_y$ and $F_z$ of input forces acting on one of the members in said directions, respectively, are transmitted without amplification to the other member.

15. The improvement according to claim 3 wherein an energy-absorbing material is installed along each edge of a brake shoe backing plate on which a brake shoe is mounted, thereby to prevent metal-to-metal contact when a backing plate engages another part of the isolator.

16. In a vibration isolator including a first member adapted to be supported on a structure, a second member adapted to support vibratory equipment and a spring system connecting the members in spaced relation for vibration isolation of the equipment from the structure, the vibration isolator having mutually perpendicular vertical medial planes of symmetry $P_y$ and $P_x$ intersecting to define a medial vertical axis Z, the improvement comprising a pair of identical friction restraint and energy-absorbing stop assemblies, one of which is located on each side of the plane of symmetry $P_y$, each assembly comprising a brake plate affixed on one of the members, the brake plate being located outwardly of the spring system, relative to the Z axis, and having a planar surface parallel to the plane $P_y$ and facing outwardly relative to the Z axis, a brake shoe in engagement with the brake plate, a housing affixed to the other member and substantially surrounding the perimeter of the brake shoe and located in uniformly spaced relation from the perimeter of the brake shoe, the vertical and lateral spacings between the perimeter of the brake shoe and the housing being equal to selected amplitudes of vibration $a_z$ and $a_y$ parallel to the axes Z and Y, respectively, the amplitudes $a_y$ and $a_z$ being greater than the amplitudes of vibration of the second member along the axes Y and Z in normal operation of the equipment mounted thereon such that the brake shoe is essentially freely movable relative to the housing up to amplitudes $a_y$ and $a_z$ horizontally and vertically and engages the housing upon movements of the first member equal to the amplitudes $a_y$ and $a_z$, spring means urging the brake shoes into frictional engagement with the brake plates to develop a component of a selected and adjusted frictional force $F_z$ acting in a direction parallel to the Z axis and a component of a selected and adjusted frictional force $F_y$ acting parallel to the Y axis, whereby substantial parts equal to the forces $F_y$ and $F_z$ of input forces acting on one of the members in said directions, respectively, are transmitted without amplification to the other member, and energy-absorbing stop means coacting between the members for restraining relative motion between them in excess of a selected amplitude $b_z$ in the vertical direction, which amplitude $b_z$ is at least equal to and not substantially greater than the amplitude $a_z$ and for absorbing energy generated by an input acceleration of one member relative to the other that generates a vertical force component on said one member of a magnitude in excess of the frictional force component $F_z$.

* * * * *

UNITED STATES PATENT AND TRADEMARK OFFICE
CERTIFICATE OF CORRECTION

PATENT NO. : 4,040,590
DATED : Aug. 9, 1977
INVENTOR(S) : Paul Baratoff

It is certified that error appears in the above-identified patent and that said Letters Patent are hereby corrected as shown below:

Col. 1, line 18, "judgements" should be --judgments--;
Col. 2, lines 58 and 59, "euqipment" should be --equipment--;
Col. 3, line 57, "energyabsorbing" should be --energy-absorbing--;
Col. 4, line 13, "floormounted" should be --floor-mounted--;
Col. 4, line 50, "anda" should be --and a--;
Col. 5, line 30, "loaddistribution" should be --load-distribution--;
Col. 7, line 49, after "semblies" insert --and stop assemblies--;
Col. 8, line 39, "mouting" should be --mounting--;
Col. 11, line 22, "b" should be --a--;
Col. 11, line 57, "member" should be --members--;
Col. 12, line 27, "energyabsorbing" should be --energy-absorbing--;
Col. 16, line 1, "relativeto" should be --relative to--.

Signed and Sealed this

Thirteenth Day of December 1977

[SEAL]

Attest:

RUTH C. MASON
Attesting Officer

LUTRELLE F. PARKER
Acting Commissioner of Patents and Trademarks